March 7, 1939. E. P. BURRELL 2,149,881
WAY GUARD FOR MACHINE TOOLS
Filed June 30, 1936 3 Sheets-Sheet 1
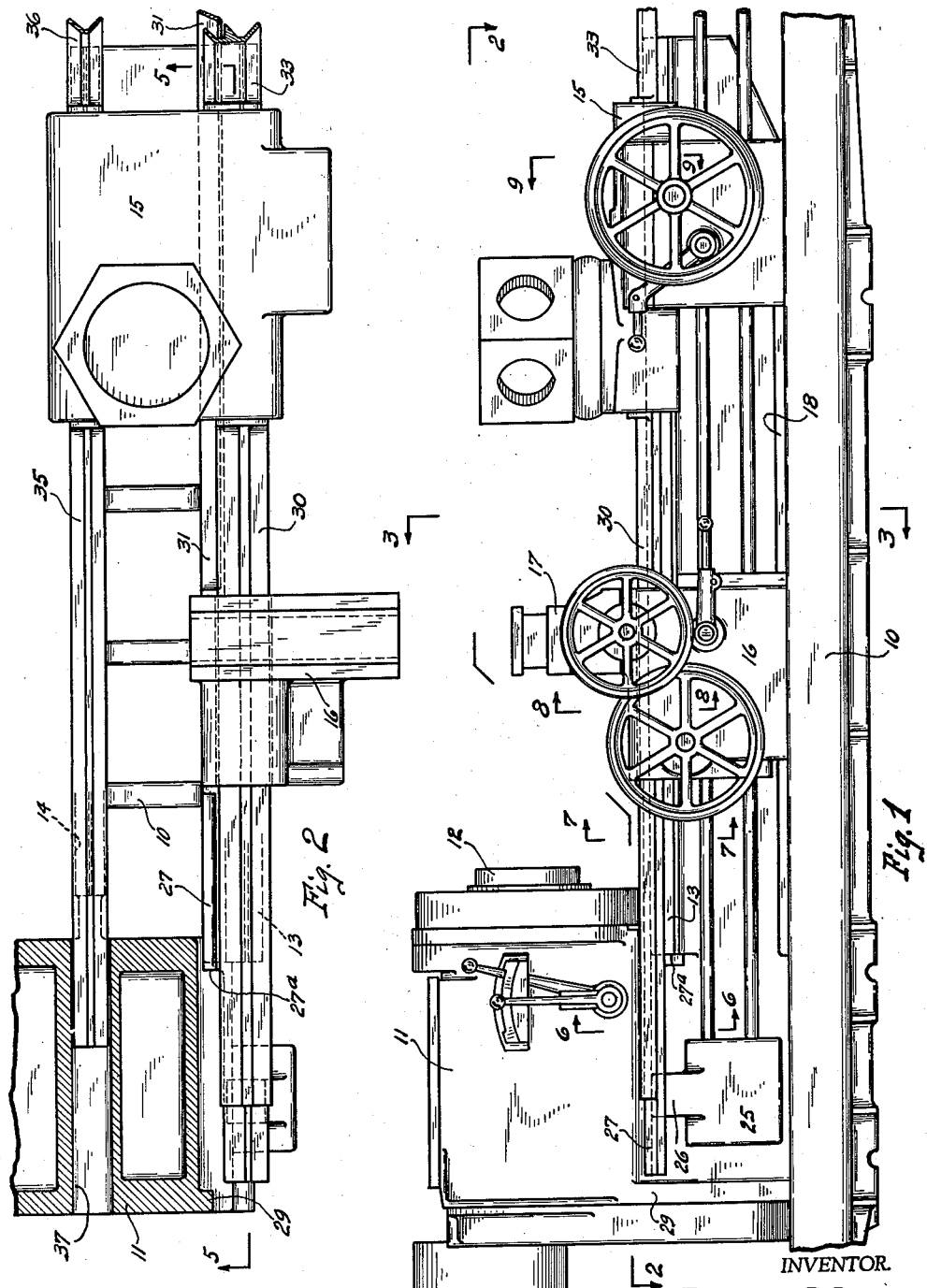

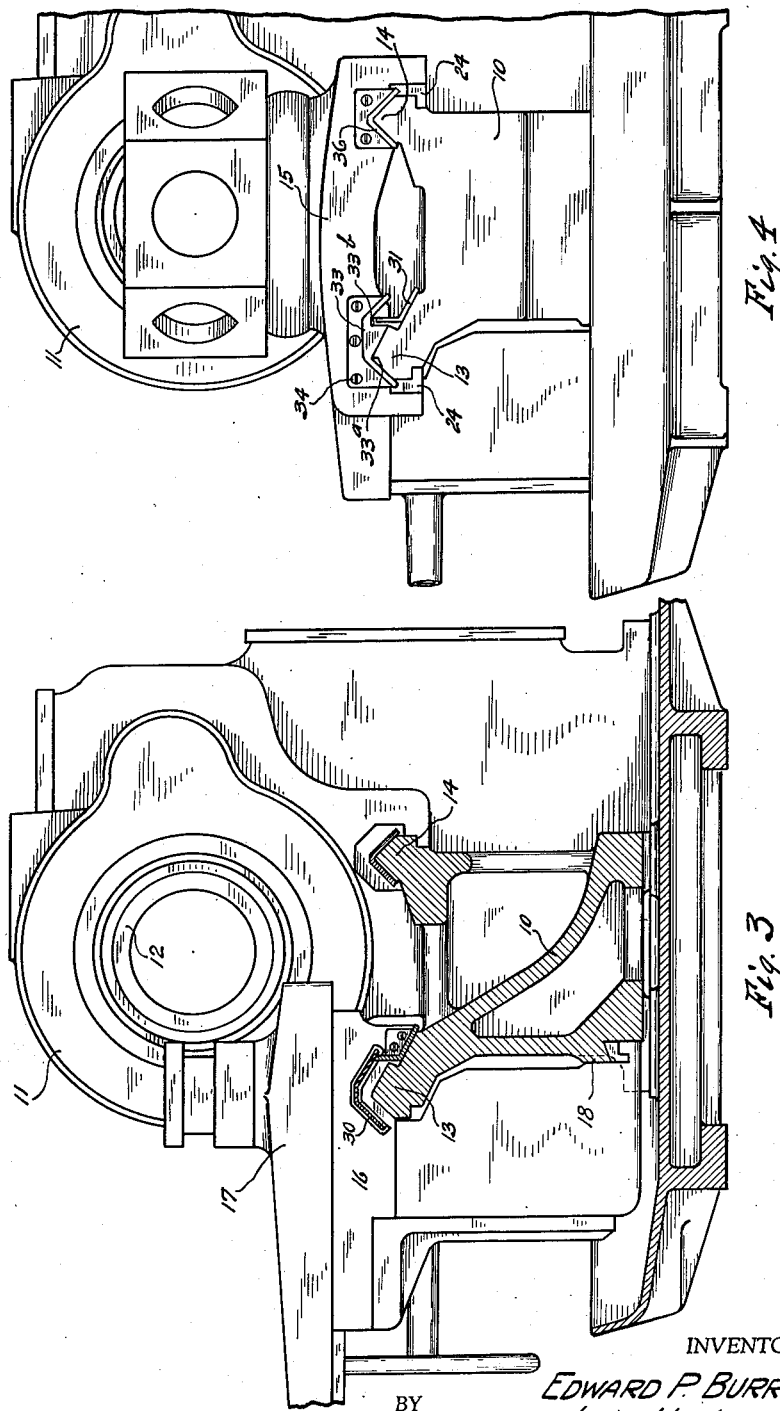

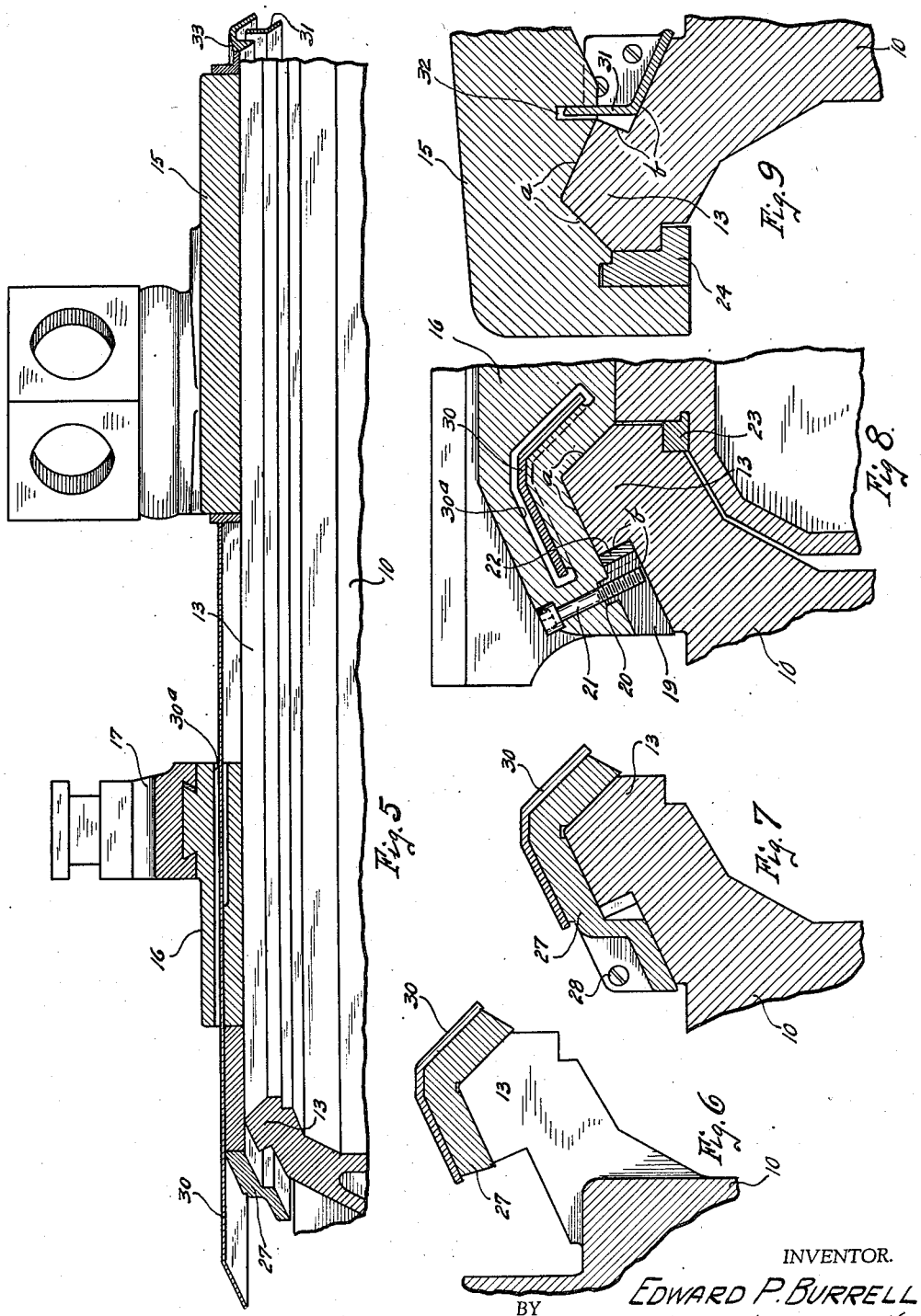

Patented Mar. 7, 1939

2,149,881

UNITED STATES PATENT OFFICE 2,149,881

WAY GUARD FOR MACHINE TOOLS

Edward P. Burrell, Shaker Heights, Ohio, assignor to The Warner & Swasey Company, Cleveland, Ohio, a corporation of Ohio Application June 30, 1936, Serial No. 88,158

22 Claims. (Cl. 82—32)

This invention relates to way guards for machine tools having two or more sliding members with at least one common way for such members.

Many machine tools, such as lathes or the like, do not have provision for protecting the ways and consequently chips, dirt and dust lodge on the ways and by mixing with the lubricant of the ways form an abrasive compound which causes serious wear on the working or contacting surfaces of the ways and the members sliding thereon, wherefore the contacting surfaces, particularly those of the ways, must be planed off from time to time or otherwise resurfaced to remove the effects of the wear and to keep the machine accurate. This is not only expensive and reduces the life of the machine, but results in an economic loss due to the fact that the machine is of necessity out of commission while thus being repaired.

Furthermore, a remachining of the surfaces requires a realignment of the sliding members with relation to the work holding spindle. In fact, the difficulties of restoring the machine to a proper working condition after it has been adversely affected by wear as thus stated are so great that it is often necessary to ship the machines to the factories to be reconditioned.

The principal object of the invention is to provide in a machine tool, and particularly in a large sized turret lathe having a stepped way or ways, means for guarding and protecting the working surfaces of the ways, and wherein one or more of the ways are common to two or more sliding members, the guarding and protecting of the ways resulting in extending the life of tools of this kind and of adequately protecting the working surfaces of the ways from chips, dirt and dust and from being injured by wrenches or heavy work pieces placed or accidentally dropped upon them.

The main objects are obtained and consist in certain novel details of construction, and combinations and arrangements of parts which will be described in the specification and set forth in the appended claims.

In the accompanying drawings the invention is illustrated as applied to a large size turret lathe. Referring to the accompanying drawings, Fig. 1 is a front elevational view of a turret lathe embodying the invention.

Fig. 2 is a fragmentary view partly in section and partly in top plan, and is taken along irregular line 2—2 of Fig. 1 looking in the direction of the arrows with certain of the parts of the cross-slide and turret slide removed.

Fig. 3 is a transverse vertical section taken substantially on line 3—3 of Fig. 1 looking in the direction of the arrows.

Fig. 4 is an end elevational view of the machine shown in Fig. 1 and is taken from the right hand side of said figure looking toward the left.

Fig. 5 is a longitudinal sectional view taken substantially on line 5—5 of Fig. 2 looking in the direction of the arrows, and Figs. 6, 7, 8 and 9 are fragmentary sectional views taken respectively on lines 6—6, 7—7, 8—8 and 9—9 of Fig. 1, looking in the direction of the arrows.

The machine tool illustrated in the drawings is a turret lathe, and comprises a bed 10 and a head 11 provided with the usual spindle, the nose 12 of which is clearly shown in Fig. 1. The bed 10 has longitudinally extending ways 13 and 14, upon both of which is slidably mounted a turret slide 15. A carriage 16 having a cross-slide 17 is mounted, in this instance only, on the front way 13, but it will be understood that in other instances the carriage could be supported on both the front way 13 and the rear way 14, as will be well understood in the art. A secondary longitudinally extending way 18 is formed on the front of the bed adjacent the lower end thereof, and the lower portion of the apron of the carriage 16 is slidably supported on this secondary way. The elements of the machine as thus described are well known in the art, and it will be understood that the turret slide and the cross-slide carriage are both movable toward or away from the head 11 and from each other and that the front way 13 is common to both members.

It is proposed that at least the front way 13 common to both sliding members be constructed with a stepped formation, for the purpose of better supporting the cross-slide carriage in order to efficiently resist the thrust set up by the cutting pressures when the tools of the cross-slide are operating upon the work. The use of the stepped way is especially important in connection with large size machine tools, wherein the thrusts set up by the cutting pressures are very great.

Referring to Fig. 8, which is a section through the cross-slide carriage and front way 13, it will be clearly seen that the configuration of said way is such as to provide two V-shaped way portions, one of which faces downwardly and is included between the lines $a$, and the other of which faces diagonally upwardly and is included between the lines $b$, such V-shaped portions hereinafter being referred to as portion $a$ and portion $b$. The way 13, it will be noted, thus provides two distinct supporting surfaces for the cross-slide carriage and which form a step with the V-portion $a$ taking the downward thrust and the V-portion $b$ the horizontal thrust, wherefore a good thrust relationship exists between the cross-slide carriage and the way, since both V portions will take the component of the two thrust forces.

It will be understood that the surfaces of the step way 13 are very accurately machined, while in order to facilitate the assembly of the cross-slide carriage upon the way a bearing strip 19 provided with a tongue which fits into a groove 20 formed in the carriage is removably connected to the carriage by means of securing screws 21, a suitable adjustable tapered gib 22 being inserted between the inner side of the strip 19 and the way 13.

It will be seen that in assemblying the cross-slide carriage upon the way the strip 19 ran be slid in from the end of the carriage and then secured in position by the bolts 21, after which the tapered gib 22 may be positioned to take up any play between the strip 19 and the way. As is customary, a clamp or gib 23 is arranged between the cross-slide carriage and the way 13 to prevent upward movement of the carriage relative to the way.

It will be seen that a stepped way, such as the way 13, presents a problem in connection with providing suitable guard means for the way and the different surfaces thereof, and the present invention contemplates the provision of a novel guard means for a way of this character and constitutes an improvement over the way guard construction shown in the Burrell and Van Hamersveld Reissue Patent No. 16,534, reissued January 11, 1927. In the construction shown in the said patent it will be observed that all of the ways are of the usual single V type.

The turret slide 15, as has been previously explained, slides on both of the ways 13 and 14, and reference to Fig. 9 will show that the turret slide only engages the V portion $a$ of the way 13, and does not engage the V portion $b$ thereof, as does the cross-slide carriage 16. The turret slide 15 is held against upward movement relative to the ways 13 and 14 by means of suitable gibs 24. It will be seen that the way 13 is common to both the cross-slide carriage and the turret slide, while the rear way 14 in this instance is of the single V type and slidably supports only the turret slide. It will be understood, of course, that both ways could be of the stepped or double V type, and that the cross-slide carriage could be supported on both the front and rear ways and omitting the secondary way 18, as shown in Figs. 12 and 13 in the said Burrell and Van Hamersveld Reissue Patent No. 16,534.

The gear housing 25 for the ends of the feed shafts that extend along the front of the bed adjacent the head of the machine is provided with an upwardly extending projection 26, the upper end of which is V-shaped, similar to the V-portion $a$ of way 13, and slidably supports a supporting bar 27 of downwardly facing V-shaped configuration, as clearly shown in Figs. 6 and 7. The bar 27 extends to the cross-slide carriage and is connected thereto by suitable screws 28, as indicated in Fig. 7. It will thus be seen that the supporting bar 27 rides on the way 13 and on the upper end of the projection 26, or upon the way 13 only, depending upon the position of the cross-slide carriage. The supporting bar 27 is provided with a cross-section such as is shown in Fig. 7, from the cross-slide carriage to the point indicated in Fig. 2 as 27a, while from such point to its end adjacent the head it has the cross-sectional configuration shown in Fig. 6, for the purpose of providing clearance for a flange 29 projecting from the head of the machine.

The supporting bar 27 has its upper surface machined in the form of a downwardly facing V-shape to slidably support a complementary V-shaped way guard 30 which projects through an opening 30a in the cross-slide carriage and has its end connected to the turret slide, as clearly indicated in Figs. 1, 2 and 5, it being noted that the way guard 30 overhangs the way 13 intermediate the cross-slide carriage and the turret slide, irrespective of their relative positions. It will also be seen that in addition to the way guard being slidably supported by the supporting bar 27, it may also be slidably supported by the cross-slide carriage for a portion of the length of the opening 30a, as clearly shown in Fig. 5. In this manner the way guard is adequately supported, even when the cross-slide carriage is in its most remote position with respect to the head.

It will be seen that the way guard 30 adequately protects the V-surface portion $a$ of the way 13 against chips, dirt or other foreign matter falling or being placed upon the way.

In order to fully protect the way 13, and particularly the V-shaped portion $b$ thereof, an angular way-guard strip 31 is secured to the right hand side of the cross-slide carriage as viewed in the drawings, and the lower projecting portion of said strip rides upon the lower step of the way 13, while the upwardly projecting portion of the strip extends through a slot 32 in the turret slide, as clearly indicated in Fig. 9. It will be seen that the guard strip 31 will move with the cross-slide carriage, and that the upwardly projecting portion of the guard strip 31 on its inner side contacts in the slot 32 with the turret slide, see Fig. 9, while the upper end of such portion of the guard strip is shaped to engage the underside of the way guard 30, as shown in Fig. 3, to provide a further support for the way guard. It will be observed that the way guard 30 and the guard strip 31, together form an enclosing housing for the way 13 that fully protects both V-portions $a$ and $b$ of the way against the entrance of chips, dirt and the like.

A guard member 33 is secured to the rear or right hand end of the turret slide, as viewed in Fig. 1, and extends therefrom over the way 13 and the guard strip 31.

Referring to Fig. 4, it will be seen that the guard member 33 is secured to the turret slide by means of a flange and suitable securing screws 34, and that said guard member comprises a downwardly facing V-shaped portion 33a engaging and sliding upon the V-shaped portion $a$ of the way 13 and a downwardly facing V-grooved portion 33b which aligns with the slot 32 in the turret slide and overhangs the guard strip 31.

From the foregoing it will be observed that the way 13 to the right of the turret slide is fully protected against chips, dirt or other foreign matter falling from the tools carried by the turret or otherwise dropping thereon.

In the present illustration the rear way 14 is shown as slidingly supporting only the turret slide, and, therefore, this way can be protected by a way guard 35 secured to the left hand end of the turret slide as viewed in the drawings and extending along and riding upon the way 14, and by a similar way guard 36 secured to the right hand end of the turret slide and also overlying and riding upon the way. The way guard 35 is of sufficient length to protect the way 14 when the turret slide is in its most rearward position, and when said slide is moved toward the head the way guard can be accommodated in an opening 37 formed in the head, as clearly shown in Fig. 2.

As previously stated, in some instances the cross-slide carriage might be supported by both the front and rear ways of the bed, eliminating the secondary way 18, and in such event the rear way 14 would be of stepped formation similar to the front way 13 and such stepped way would be protected in the same manner as has been described with reference to the way 13, with the exception that the way guard and a bearing strip similar to the strip 27 would project through the opening 37 in the head.

From the foregoing description it will be seen that the cross-slide carriage and the turret slide may be located in any position along the bed to accommodate the various lengths of work between minimum and maximum, and that at all times the ways of the bed will be fully protected from chips, dirt or other objects falling thereon.

It will also be noted that the supporting bar 27 which slides upon the way 13 slidably supports the way guard 30 and hence eliminates warping or distortion of the way guard should heavy objects fall or be placed thereon, as might occur during loading operations.

It will also be remembered that the cross-slide carriage is very effectively supported due to the employment of the stepped way 13 which takes the horizontal and vertical thrust created by the pressures of the cutting tools on the cross-slide and without causing any uplift to the cross-slide carriage under the horizontal thrusts. This is especially advantageous in connection with large size turret lathes or other machine tools.

Although a preferred embodiment of the invention has been illustrated and described herein, it will be understood that the invention is susceptible of various modifications and adaptations within the scope of the appended claims.

Having thus described my invention I claim:

1. A machine tool having a bed provided with ways and a plurality of slidable members, one of said ways being common to said slidable members and of stepped formation on one side thereof with the entire way including the steps slidably supporting one of said members, and guard members extending over the common way protecting the working surfaces thereof without interfering with the movements of the sliding members.

2. A machine tool having a bed provided with ways for a plurality of slidable members, one of said ways being common to said slidable members and of stepped formation on one side thereof with the entire way including the steps slidably supporting one of said members, and guard members extending over the common way and protecting the working surfaces of the steps thereof without interfering with the movements of the slidable members, said guard members being composed of relatively sliding parts carried by said slidable members.

3. A machine tool having a bed provided with ways and a plurality of slidable members, one of said ways being common to said slidable members and of stepped formation on one side thereof with the entire way including the steps slidably supporting one of said members, and guard members extending over the common way and protecting the working surfaces of the steps thereof without interfering with the movements of the slidable members, said guard members being in overlapping relation and one attached to one slidable member and another to another slidable member.

4. A machine tool having a bed provided with ways and a plurality of slidable members, one of said ways being common to said slidable members and of stepped formation on one side thereof with the entire way including the steps slidably supporting one of said members, and guard members extending over the common way and protecting the working surface of the steps thereof without interfering with the movements of the slidable members, one of said guard members being secured to one of the slidable members and protecting one of the steps of the common way, and another guard member being secured to the other slidable member and protecting another step of the way.

5. A machine tool having a bed provided with ways and a plurality of slidable members, one of said ways being common to said slidable members and of stepped formation with the steps thereof slidably supporting one of said members, and guard members extending over the common way and protecting the working surfaces of the steps thereof without interfering with the movements of the slidable members, one of said guard members being secured to one of the slidable members and protecting one of the steps of the stepped way, and another guard member being secured to the other slidable member and protecting another step of the way, said guard members contacting each other and forming a housing surrounding the working surfaces of the stepped way.

6. A machine tool having a bed provided with ways and a plurality of slidable members, one of said ways being common to said slidable members and of stepped formation with the steps thereof slidably supporting one of said members, a supporting bar slidable upon the steps of said common way and movable with one of said slidable members, and a guard member slidable upon said supporting bar and movable with the other of said slidable members.

7. A machine tool having a bed provided with ways and a plurality of slidable members, one of said ways being common to said slidable members and of stepped formation with the steps thereof slidably supporting one of said members, a supporting bar slidably supported upon the steps of said common way and movable with one of said slidable members, and a way guard slidably supported upon said supporting bar and movable with the other of said slidable members.

8. A machine tool having a head and a bed provided with ways, a cross-slide carriage, and a thrust slide, one of said ways being common to said carriage and slide and being of stepped formation with the steps thereof slidably supporting the carriage, a supporting bar secured to the carriage and projecting toward the head and slidably supported upon the steps of said common way, and a way guard secured to the turret slide and extending over the stepped way and through the carriage and slidably supported upon said supporting bar.

9. A machine tool having a bed provided with ways and a plurality of slidable members, one of said ways being common to said slidable members and of stepped formation with the steps thereof slidably supporting one of said members, and guard members extending over the common stepped way, one of said guard members overlying in spaced relation one of the steps of the stepped way and another guard member overlying another step of the way, said guard members being in contacting relatively slidable relationship and enclosing the steps of the way.

10. A machine tool having a bed provided with ways and a plurality of slidable members, one of said ways being common to said slidable members and of stepped formation with the steps thereof slidably supporting one of the slidable members, and relatively movable guard members extending over the common stepped way, one of said guard members overlying one of the steps of the way and secured to one of the slidable members and passing through an opening in another of the slidable members, and another guard member overlying another step of the way and secured to the last mentioned slidable member and passing through a slot in the first mentioned slidable member.

11. A machine tool having a bed provided with ways and a plurality of slidable members, one of said ways being common to said slidable members and formed of a plurality of steps upon all of which steps one of said slidable members is supported, a way guard secured to one of said slidable members and movable therewith and overlying said stepped way, and a supporting bar secured to one of said slidable members and movable therewith and interposed between said stepped way and said way guard.

12. A machine tool having a bed provided with ways and a plurality of slidable members, one of the ways being common to said slidable members and provided with two V-shaped portions slidably supporting one of said members, and guard members extending over the common way protecting the working surfaces thereof without interfering with the movements of the sliding members.

13. A machine tool having a bed provided with ways and a plurality of slidable members, one of said ways being common to said slidable members and provided with two V-shaped portions slidably supporting one of said members, and guard members extending over the common way and protecting the working surfaces of the V-shaped portions thereof without interfering with the movements of the slidable members, said guard members being in overlapping relationship and one attached to one slidable member and another to another slidable member.

14. A machine tool having a bed provided with ways and a plurality of slidable members, one of said ways being common to said slidable members and provided with two V-shaped portions which slidably support one of said members, and guard members extending over the common way and protecting the working surfaces thereof without interfering with the movements of the slidable members, one of said guard members being secured to one of the slidable members and protecting one of the V-shaped portions of the common way, and another guard member being secured to the other slidable member and protecting the other V-shaped portion of the way.

15. A machine tool having a bed provided with ways and a plurality of slidable members, one of said ways being common to said slidable members and having two V-shaped portions slidably supporting one of said members, a supporting bar slidable upon the V-shaped portions of said common way and movable with one of said slidable members, and a guard member slidable upon said supporting bar and movable with the other of said slidable members.

16. A machine tool having a bed provided with ways and a plurality of slidable members one of said ways being common to said slidable members and provided with two V-shaped portions which slidably support one of said members, and guard members extending over the common way, one of said guard members overlying in spaced relation one of the V-shaped portions of the way and another guard member overlying the other V-shaped portion of the way, said guard members being in contacting relatively slidable relationship and forming a housing for the V-shaped portions of the way.

17. A machine tool having a bed provided with ways and a plurality of slidable members, one of said ways being common to said slidable members and provided with two V-shaped portions which slidably support one of the slidable members, and relatively movable guard members extending over the common way, one of said guard members overlying one of the V-shaped portions of the way and secured to one of the slidable members and passing through an opening in another of the slidable members, and another guard member overlying the other V-shaped portion of the way and secured to the last mentioned slidable member and passing through a slot in the first mentioned slidable member.

18. A machine tool comprising a bed provided with a way and a slidable member supported upon said way, said way having a pair of V-shaped portions one of which takes substantially the vertical thrust of said member and the other of which takes substantially the lateral thrust thereof.

19. A machine tool comprising a rotatable spindle, a bed provided with a way and a member slidably supported upon said way, said way comprising a pair of V-shaped portions facing in different directions with one of said portions taking the substantially vertical thrust of said member and the other of said portions taking the substantially lateral thrust thereof in a direction away from the vertical center line of the spindle.

20. A machine tool comprising a rotatable spindle, a bed provided with a way and a member slidably supported on said way, said way having a downwardly facing V-shaped portion and a V-shaped portion facing laterally away from the vertical center line of the spindle for taking the vertical and lateral thrusts of said member.

21. A machine tool comprising a bed having a way and a member slidably supported on said way, said way including two V-shaped portions, said member engaging one of said V-shaped portions and overlying the other of said V-shaped portions, a gib in said last named V-shaped portion and contacting the way, and a removable strip also arranged in said last mentioned V-shaped portion in contact with said gib and secured to said member whereby the assembly of the member upon the way is facilitated.

22. A machine tool comprising a rotatable spindle, a bed provided with a way and a member slidably supported upon said way, said way including a pair of V-shaped portions taking the thrusts of said member in a direction away from the vertical center line of said spindle and in angularly disposed directions.

EDWARD P. BURRELL.